US011866133B1

(12) United States Patent
Mueller et al.

(10) Patent No.: US 11,866,133 B1
(45) Date of Patent: Jan. 9, 2024

(54) MARINE PROPULSION DEVICE WITH FLEXIBLE CONDUIT IN LOWER UNIT

(71) Applicant: Brunswick Corporation, Mettawa, IL (US)

(72) Inventors: Laura K. Mueller, Fond du Lac, WI (US); Joshua S. Smith, Mayville, WI (US); Steven L. Jaeger, Cascade, WI (US)

(73) Assignee: Brunswick Corporation, Mettawa, IL (US)

( * ) Notice: Subject to any disclaimer, the term of this patent is extended or adjusted under 35 U.S.C. 154(b) by 386 days.

(21) Appl. No.: 17/348,210

(22) Filed: Jun. 15, 2021

(51) Int. Cl.

| | |
|---|---|
| ***B63B 79/10*** | (2020.01) |
| ***B63H 1/14*** | (2006.01) |
| ***H01B 7/00*** | (2006.01) |
| ***B63H 23/34*** | (2006.01) |
| ***B63H 20/00*** | (2006.01) |
| ***B63H 25/52*** | (2006.01) |

(52) U.S. Cl.
CPC ............... *B63B 79/10* (2020.01); *B63H 1/14* (2013.01); *B63H 20/00* (2013.01); *B63H 23/34* (2013.01); *B63H 25/52* (2013.01); *H01B 7/0045* (2013.01)

(58) Field of Classification Search
CPC .......... B63H 1/14; B63H 20/08; B63H 20/12; B63H 20/20; B63H 20/32; B63H 2020/23; B63H 23/34; B63H 25/52; B63B 79/00; B63B 79/10; H01B 7/0045
USPC ........................................... 440/49, 61 S, 76
See application file for complete search history.

(56) References Cited

U.S. PATENT DOCUMENTS

| | | | | |
|---|---|---|---|---|
| 4,318,699 | A | 3/1982 | Wenstadt et al. | |
| 4,495,810 | A | 1/1985 | Tessarzik et al. | |
| 5,476,400 | A * | 12/1995 | Theophanides ........ | B63H 23/26 440/5 |
| 5,709,475 | A | 1/1998 | Stoor | |
| 7,470,162 | B2 | 12/2008 | Miyashita et al. | |
| 7,850,496 | B1 | 12/2010 | Eichinger | |
| 8,746,410 | B1 | 6/2014 | Lekowicz | |
| 9,475,560 | B1 | 10/2016 | Jaszewski et al. | |
| 9,630,694 | B1 | 4/2017 | Jaszewski et al. | |
| 9,896,172 | B1 | 2/2018 | Pugh et al. | |
| 10,065,722 | B1 | 9/2018 | Jaszewski et al. | |
| 10,502,312 | B1 | 12/2019 | Jaszewski et al. | |
| 10,800,502 | B1 * | 10/2020 | Alby ...................... | B63H 5/125 |

FOREIGN PATENT DOCUMENTS

| | | |
|---|---|---|
| EP | 3417248 B1 | 4/2021 |

* cited by examiner

*Primary Examiner* — Daniel V Venne
(74) *Attorney, Agent, or Firm* — Andrus Intellectual Property Law, LLP

(57) ABSTRACT

A marine propulsion device has a powerhead, a driveshaft powered by the powerhead, a lower unit, and a propeller shaft supported in the lower unit and in torque transmitting relationship with the driveshaft. The marine propulsion device also has a steering column through which the driveshaft extends and to which the lower unit is coupled. The steering column is configured to rotate the lower unit with respect to the powerhead. There is a steering housing through which the steering column extends, the steering housing being stationary with respect to the powerhead. A flexible conduit, for example a wiring harness, extends through an aperture in the steering housing and through an aperture in the steering column. The flexible conduit has slack between the steering housing and the steering column.

20 Claims, 7 Drawing Sheets

MARINE PROPULSION DEVICE WITH FLEXIBLE CONDUIT IN LOWER UNIT

FIELD

The present disclosure relates to marine propulsion devices in which the lower unit is steerable independently of the powerhead.

BACKGROUND

U.S. Pat. No. 7,850,496 discloses a lubrication draining and filling system providing oil passages that direct a flow of liquid oil from a bottom region of an oil sump, located within a rotatable portion of the marine propulsion system, to a discharge port which is connectable in fluid communication with a device that can sufficiently lower the pressure at the discharge port to induce the upward flow of oil from the lower portion of the oil sump within the gear case. The cavity of the oil sump within the gear case is disposed within a rotatable portion of the marine propulsion device while the discharge port is located within a stationary portion of the marine propulsion device. A transitional region comprises a space located between the stationary and rotatable portions. The oil can therefore flow from a rotatable portion, into the space, and then from the space into the stationary portion which allows it to be removed from the marine propulsion device.

U.S. Pat. No. 9,475,560 discloses an outboard motor including an internal combustion engine, and an adapter plate having an upper end that supports the engine and a lower end formed as a cylindrical neck. A driveshaft housing below the adapter plate has an integral oil sump collecting oil that drains from the engine and through the adapter plate neck. One or more bearings couple the adapter plate neck to the oil sump such that the driveshaft housing is suspended from and rotatable with respect to the adapter plate. A driveshaft is coupled to a crankshaft of the engine, and extends along a driveshaft axis through the adapter plate neck, bearing(s), and oil sump. A steering actuator is coupled to and rotates the oil sump, and thus the driveshaft housing, around the driveshaft axis with respect to the adapter plate, which varies a direction of the outboard motor's thrust.

U.S. Pat. No. 9,630,694 discloses an outboard marine engine comprising an internal combustion engine; a lower gearcase, a set of gears disposed in the lower gearcase, the set of gears being configured to transfer power from the internal combustion engine to drive a propulsor to generate a thrust on the outboard marine engine, and a dipstick that extends into the lower gearcase. The dipstick is removable from the lower gearcase and configured to indicate a level of lubrication in the lower gearcase.

U.S. Pat. No. 9,896,172 discloses a lubrication system in a marine drive having a lubrication circuit that conveys lubrication to componentry of the marine drive and a lubrication service port connected to the lubrication circuit. The lubrication system further includes a pump disposed in the marine drive, wherein the pump pumps lubrication through the lubrication circuit. A hydraulic valve is connected to the lubrication circuit, wherein the hydraulic valve has a normal operating position wherein lubrication in the lubrication circuit is pumped by the pump to the componentry, and has a servicing position wherein lubrication in the lubrication circuit is pumped by the pump to the lubrication service port.

U.S. Pat. No. 10,065,722 discloses an outboard marine engine comprising an internal combustion engine; a lower gearcase, a set of gears disposed in the lower gearcase, the set of gears being configured to transfer power from the internal combustion engine to drive a propulsor to generate a thrust on the outboard marine engine, and a dipstick that extends into the lower gearcase. The dipstick is removable from the lower gearcase and configured to indicate a level of lubrication in the lower gearcase.

U.S. Pat. No. 10,502,312 discloses an outboard motor having an internal combustion engine that rotates a driveshaft disposed in a driveshaft housing, a transmission that is operatively connected to the driveshaft and is disposed in a transmission housing located below the driveshaft housing, a set of angle gears that operatively connect the transmission to a propulsor for imparting a propulsive force in a body of water, wherein the set of angle gears are located in a lower gearcase located below the transmission housing, and a lubrication system that circulates lubricant to and from the transmission.

U.S. Pat. No. 10,800,502 discloses an outboard motor having a powerhead that causes rotation of a driveshaft, a steering housing located below the powerhead, wherein the driveshaft extends from the powerhead into the steering housing; and a lower gearcase located below the steering housing and supporting a propeller shaft that is coupled to the driveshaft so that rotation of the driveshaft causes rotation of the propeller shaft. The lower gearcase is steerable about a steering axis with respect to the steering housing and powerhead.

U.S. patent application Ser. No. 16/938,464, filed Jul. 24, 2020, discloses a cooling system for an outboard motor of a marine vessel. The cooling system includes an oil sump housing having an inner housing wall and an outer housing wall. The inner housing wall defines a transmission mounting cavity, and the inner housing wall and the outer housing wall defines an oil containment cavity that at least partially surrounds the transmission mounting cavity. The cooling system further includes a first sprayer nozzle and a second sprayer nozzle. Both the first sprayer nozzle and the second sprayer nozzle are coupled to the oil sump housing and configured to spray cooling fluid within the transmission mounting cavity onto an inner surface of the inner housing wall.

U.S. patent application Ser. No. 17/171,600, filed Feb. 9, 2021, discloses an outboard motor for propelling a marine vessel. The outboard motor has a top cowl and a service lid on the top cowl. A powerhead compartment is defined within the top cowl, wherein the service lid is movable into and between a closed position enclosing the powerhead compartment and an open position providing manual access to the powerhead compartment from above the outboard motor. An engine is in the powerhead compartment, wherein a peripheral gap is defined between the top cowl and the engine. A serviceable engine oil device is in the peripheral gap and is manually accessible from above the outboard motor when the service lid is in the open position. A serviceable transmission fluid device is in the peripheral gap and is manually accessible from above the outboard motor when the service lid is in the open position. A serviceable gearcase fluid device is in the peripheral gap and is manually accessible from above the outboard motor when the service lid is in the open position.

The above-noted patents and patent applications are hereby incorporated by reference herein in their entireties.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a marine propulsion device comprises a powerhead, a driveshaft powered by the powerhead, a lower unit, and a propeller shaft supported in the lower unit and in torque transmitting relationship with the driveshaft. The marine propulsion device also has a steering column through which the driveshaft extends and to which the lower unit is coupled. The steering column is configured to rotate the lower unit with respect to the powerhead. There is a steering housing through which the steering column extends, the steering housing being stationary with respect to the powerhead. A wiring harness extends through an aperture in the steering housing and through an aperture in the steering column. The wiring harness has slack between the steering housing and the steering column.

According to another example of the present disclosure, a marine propulsion device comprises a powerhead, a driveshaft powered by the powerhead, a lower unit, and a propeller shaft supported in the lower unit and in torque transmitting relationship with the driveshaft. The marine propulsion device also comprises a rotatable portion through which the driveshaft extends and to which the lower unit is coupled. The rotatable portion is configured to rotate the lower unit with respect to the powerhead. The marine propulsion device has a stationary portion through which the rotatable portion extends, the stationary portion being stationary with respect to the powerhead. A flexible conduit is coupled to and extends between the stationary portion and the rotatable portion. The flexible conduit has slack between the stationary portion and the rotatable portion.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
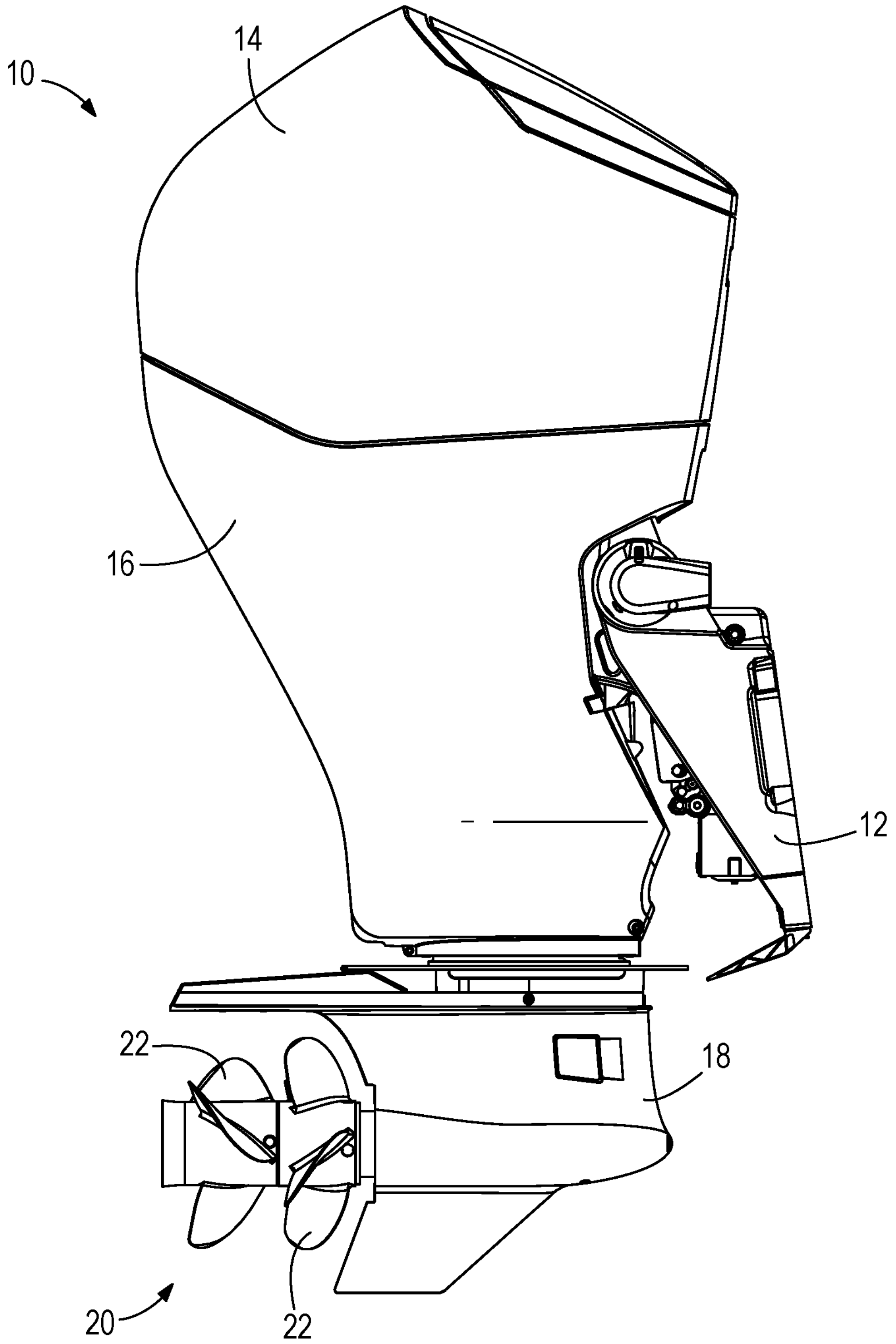
FIG. 1 is a starboard side view of an outboard motor.

FIG. 1 illustrates a starboard side view of an outboard motor or marine propulsion device 10 in accordance with an exemplary embodiment of the present disclosure. The marine propulsion device 10 is configured to be coupled to a transom of a marine vessel (not shown) via a transom bracket 12. A trim actuator may be coupled to the marine propulsion device 10 and the transom bracket 12 to trim the marine propulsion device 10 about a horizontal trim axis. The marine propulsion device 10 includes an upper cowl portion 14 and a lower cowl portion 16 that serve to house and protect various components of the marine propulsion device 10, described in further detail below with reference to FIGS. 2 and 3. A lower unit 18 (sometimes referred to as a “gearcase assembly”) is positioned below the lower cowl portion 16. The lower unit 18 houses a propeller assembly 20 having propeller blades 22. Rotation of the propeller assembly 20 causes the propeller blades 22 to impart a thrust force that propels the marine vessel.

Figure 2:
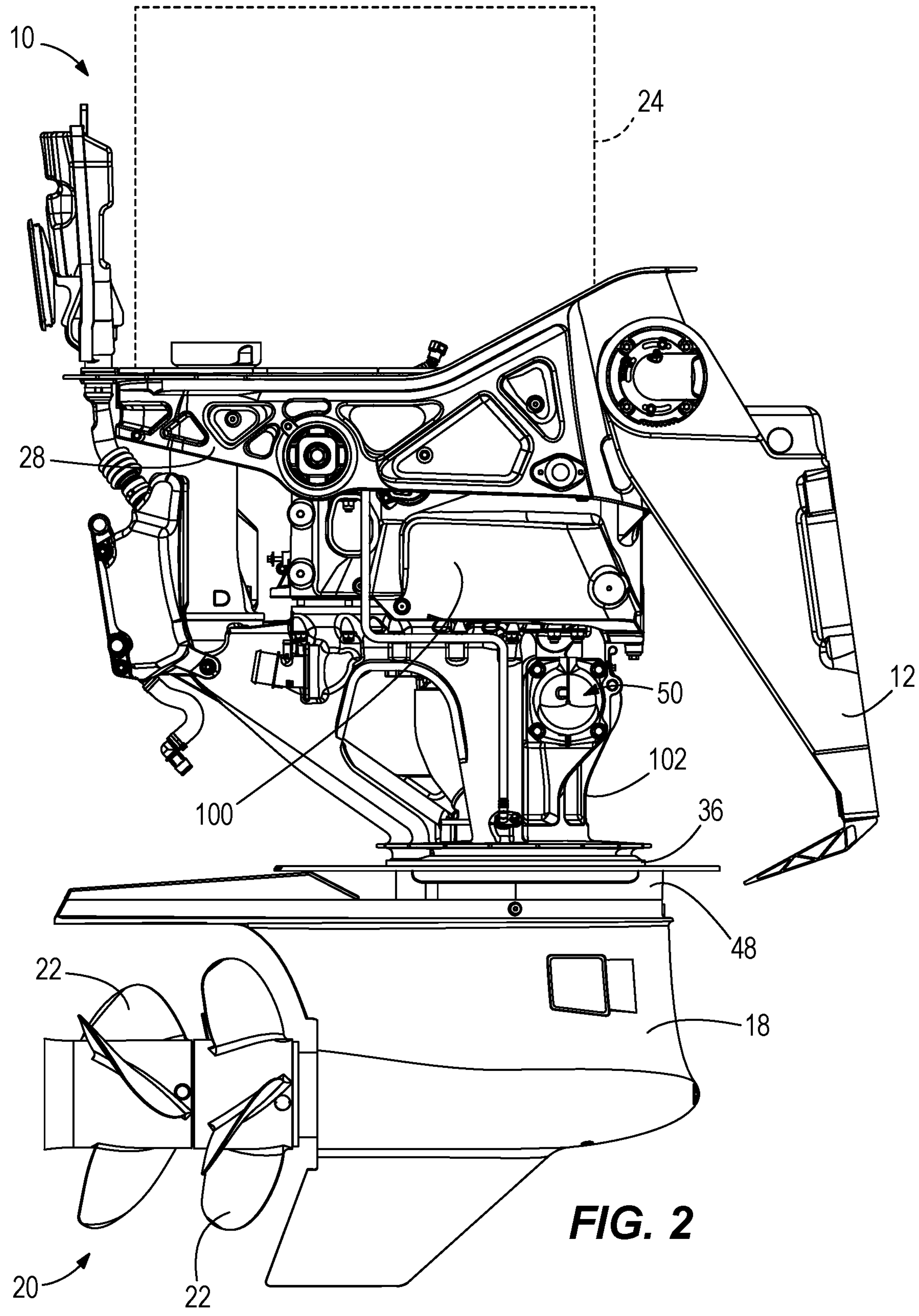
FIG. 2 is a side view of the outboard motor of FIG. 1 with the cowl removed.
Figure 3:
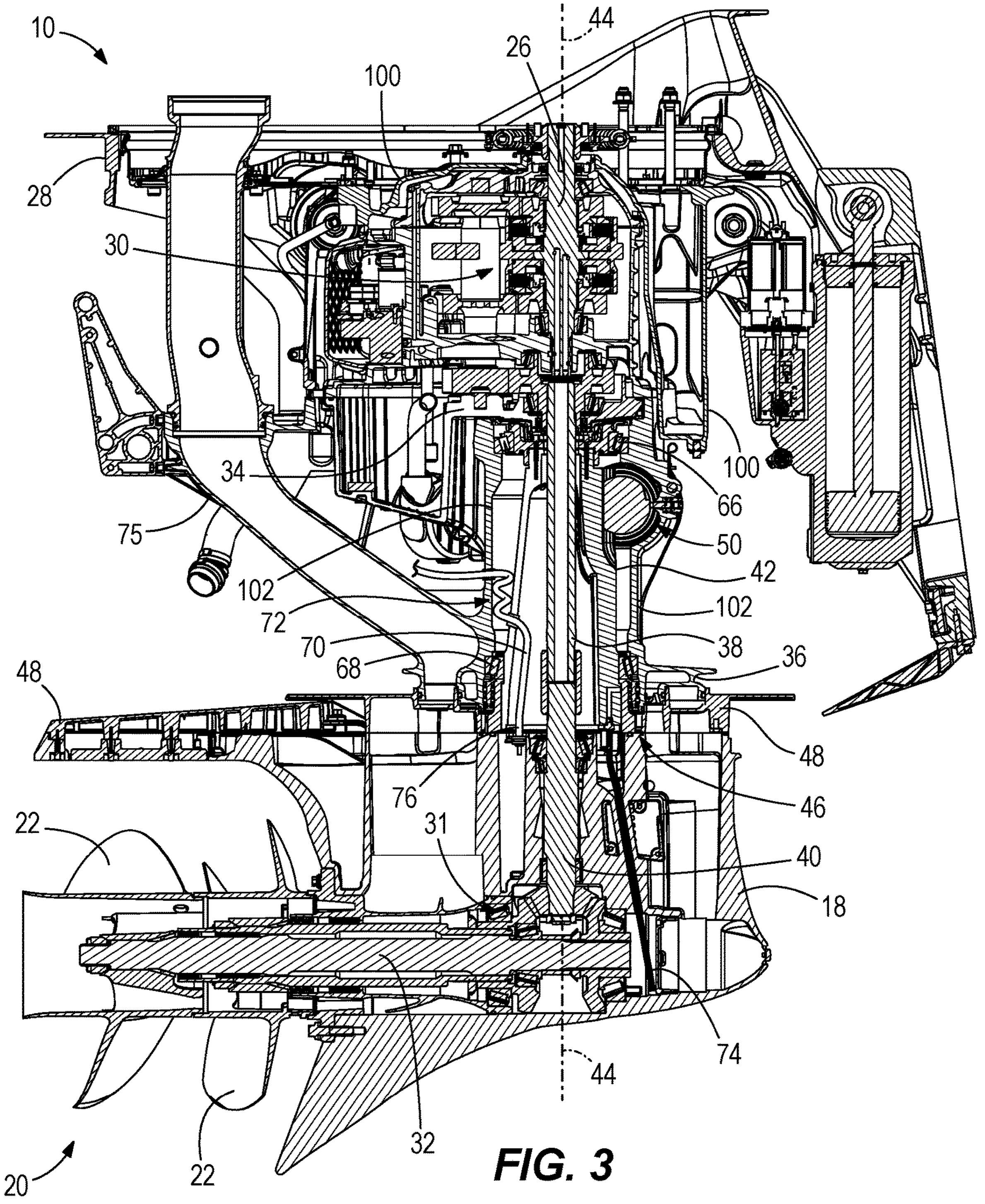
FIG. 3 is side cross-sectional view of the driveshaft assembly of the outboard motor of FIG. 1.

Referring now to FIGS. 2 and 3, starboard side and cross-sectional views of the marine propulsion device 10 with the cowl portions 14, 16 removed are respectively depicted. As is conventional and thus not shown in detail, the marine propulsion device 10 has a powerhead 24 that causes rotation of a generally vertically extending driveshaft 26 (shown in FIG. 3). In an exemplary implementation, the powerhead 24 is supported by an isolation mounting cradle 28 that is coupled to the transom bracket 12. The isolation mounting cradle 28 may act to dampen vibrations induced by the powerhead 24 and other components to reduce the transmission of induced resonance and vibration to the hull, cabin, and instruments of the marine vessel. In other implementations, the powerhead 24 may be mounted to the transom bracket 12 using a different structural member.

The powerhead 24 is shown schematically in FIG. 2, and for example can be an internal combustion engine, electric motor, and/or any other mechanism for causing rotation of the driveshaft 26. In FIG. 3, the driveshaft 26 is shown to extend through a lubricant sump assembly 100 located below the powerhead 24. A lubricant containment cavity in the lubricant sump assembly 100 collects and stores lubricant (e.g., oil, synthetic lubricant) that drains from the powerhead 24. The driveshaft 26 is shown to be coupled to a transmission 30 that is mounted within a transmission housing cavity of the lubricant sump assembly 100 for engaging forward, reverse, and neutral gear positions of the marine propulsion device 10.

A steering housing 102 is located below the lubricant sump assembly 100. The steering housing 102 has upper and lower perimeter mounting flanges 34, 36. The upper perimeter mounting flange 34 is fixed to the lower perimeter of the lubricant sump assembly 100 by bolts so that the steering housing 102 and lubricant sump assembly 100 remain securely fixed together. A steering column 42 defining a through-bore axially extends from top to bottom through the steering housing 102. The driveshaft 26, itself or via one or more extension members 38, 40 (together referred to herein as the “driveshaft”), axially-extends through the through-bore in the steering column 42. In the illustrated example, the steering column 42 is generally cylindrical and contains a bearing arrangement for supporting a steering assembly of the marine propulsion device 10, as will be further described herein below.

Still referring to FIG. 3, beneath the lubricant sump assembly 100, the extension member 40 of the driveshaft 26 is shown to be coupled to the propeller blades 22 of the propeller assembly 20 via a clutch assembly 31 and a substantially horizontally-aligned propeller shaft 32 located in the lower unit 18. Rotation of the driveshaft 26 causes rotation of the propeller shaft 32, which in turn causes rotation of the propeller blades 22 of the propeller assembly 20. The type of propulsor can vary, however, and for example can be an impeller or any other mechanism for propelling the marine vessel in water.

Referring to FIGS. 1-5, the lower unit 18 is steerable about a steering axis 44 with respect to the steering housing 102 and powerhead 24. In the illustrated example, the steering axis 44 is coaxial with the driveshaft 26 and its extension members 38, 40. The steering column 42 (FIG. 3) is fixed to the top of the lower unit 18 and extends upwardly into the bottom of the steering housing 102. A lower unit cover 48 is fixed to the top of the lower unit 18. Optionally, the lower unit cover 48 is a plate member that is a separate component from the lower unit 18. A lower end 46 of the steering column 42 is coupled to the lower unit 18 and/or lower unit cover 48 via bolts (not shown). The bolts fix the steering column 42 with respect to the lower unit 18 so that the lower unit 18, lower unit cover 48, and steering column 42 rotate together with respect to the steering housing 102. The manner in which the steering column 42 is fixed to the top of the lower unit 18 can vary from what is shown and described.

Figure 5:
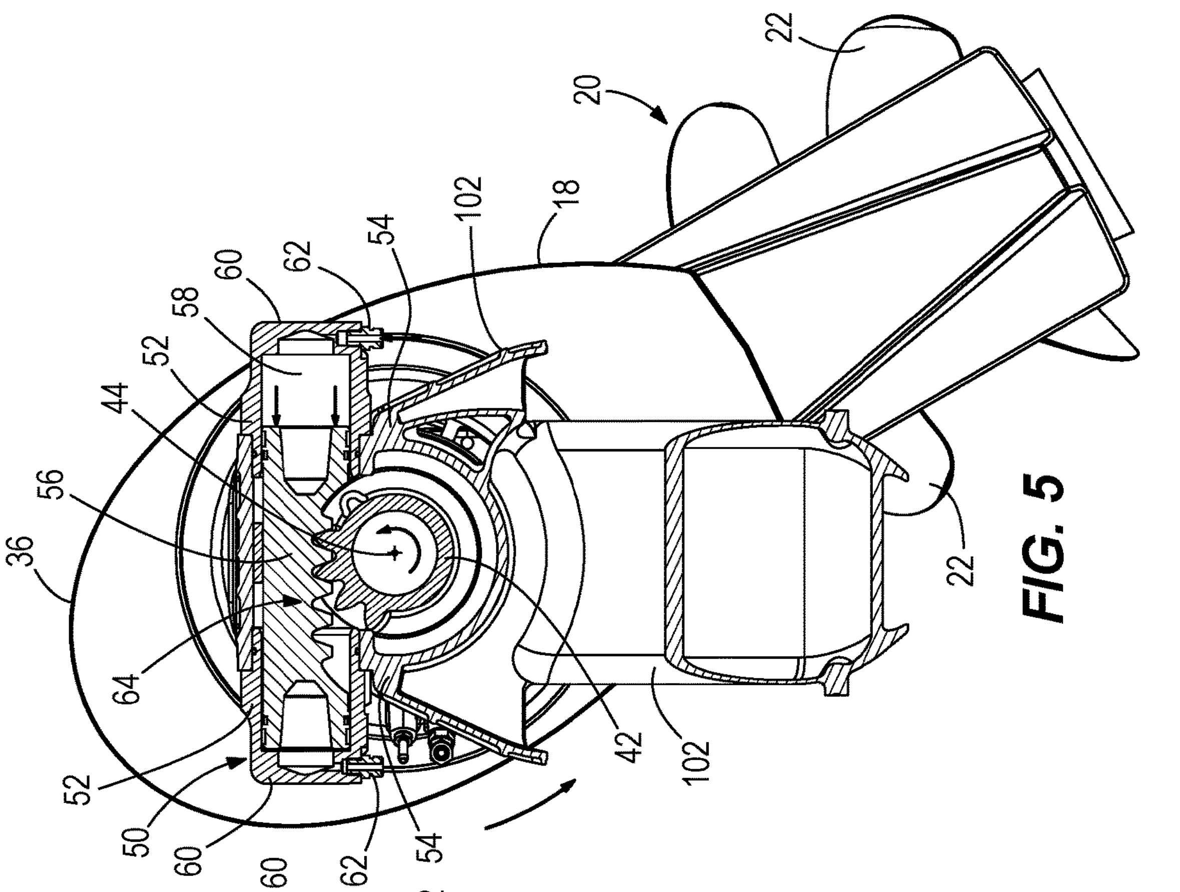
FIGS. 4 and 5 are top cross-sectional views of the outboard motor, showing steering motions of the lower unit with respect to the steering housing.
Figure 4:
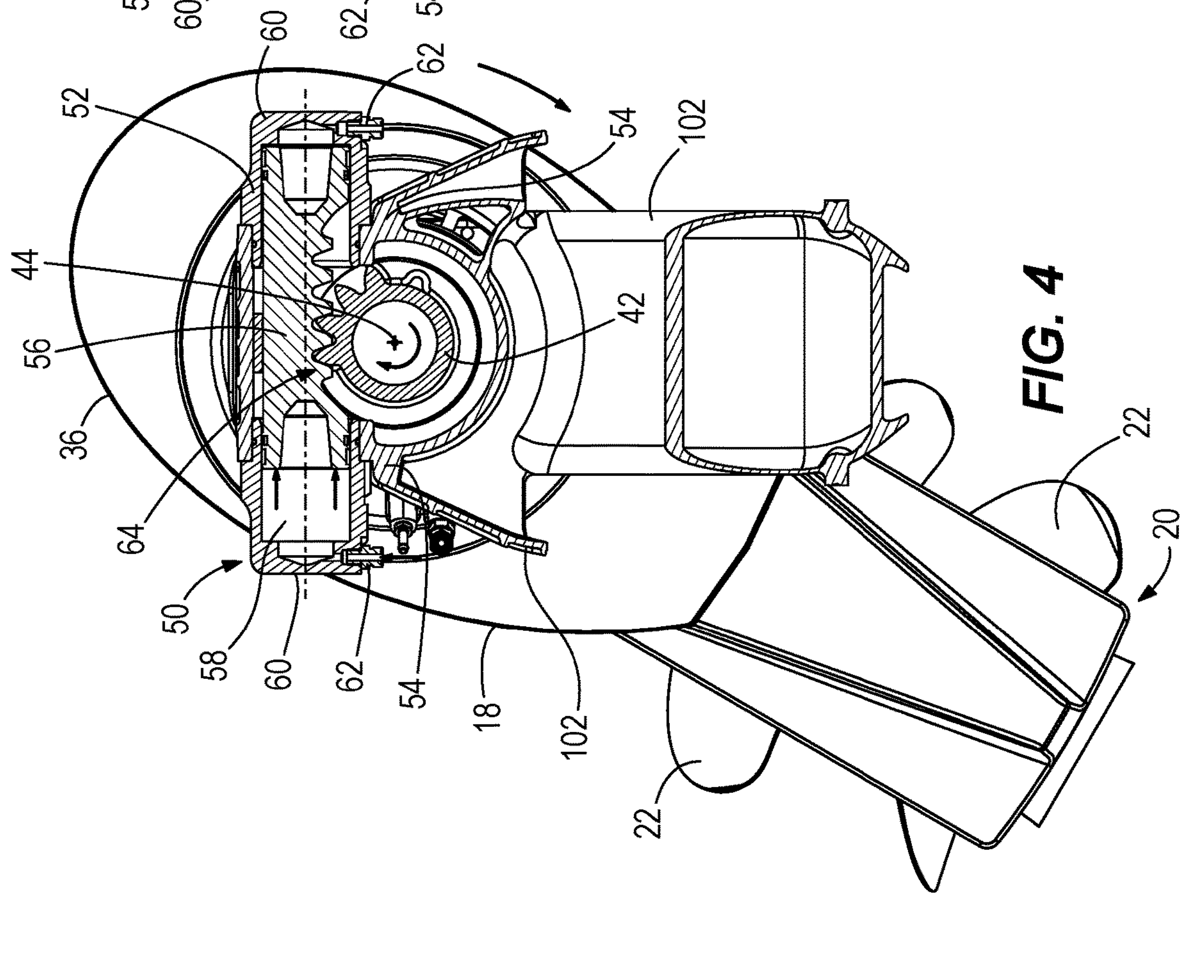

Referring to FIGS. 3-5, a steering actuator 50 is configured to rotate the steering column 42 together with lower unit 18 with respect to the steering housing 102 and powerhead 24. In the example shown, the steering actuator 50 is a hydraulically-actuated mechanism controlled by a supply of hydraulic fluid from a conventional hydraulic pump (not shown). The steering actuator 50 has an elongated cylinder 52 to which the pump provides a pressurized supply of hydraulic fluid. The elongated cylinder 52 is formed in the main body of the steering housing 102 and particularly through opposing sidewalls 54 on opposite sides of the steering housing 102, as shown. The steering actuator 50 further has an elongated piston 56 that is located in the cylinder 52. The piston 56 is sealed within the radially inner sidewalls of the cylinder 52 so as to define opposing fluid chambers 58 in the cylinder 52. The piston 56 is movable (i.e., slidable) back and forth in the cylinder 52 under pressure from the hydraulic fluid provided by the pump. End caps 60 are mounted on sidewalls 54 of the steering housing 102 to contain the hydraulic fluid in the respective fluid chambers 58 of the cylinder 52. Opposing inlets 62 are formed in the cylinder 52 and couple the fluid chambers 58 to the pump so that the pump can supply the hydraulic fluid under pressure to opposite sides of the cylinder 52 and thereby cause the piston 56 to forcibly move back and forth in the cylinder 52.

In the example shown, the steering actuator 50 is operably coupled to the steering column 42 by a rack and pinion 64, which in this example includes sets of teeth on the piston 56 and the steering column 42, respectively. The sets of teeth are meshed together so that back-and-forth movement of the piston 56 within the cylinder 52 causes the teeth on the piston 56 to move teeth on the steering column 42, which in turn causes corresponding back-and-forth rotational movement of the steering column 42 about the steering axis 44. Thus, operation of the steering actuator 50 causes the rack and pinion 64 to rotate the steering column 42 together with the lower unit 18 about the steering axis 44 with respect to the steering housing 102 and powerhead 24. The supply of pressurized hydraulic fluid from the pump to the cylinder 52 can be controlled by a conventional valve arrangement and a conventional operator input device for controlling steering movement of a marine propulsion device, such as a steering wheel, joystick, and/or the like, all as is conventional.

The type and configuration of the steering actuator 50 can vary. In another example, the steering actuator 50 can be coupled to the steering column 42 by way of a yoke splined or keyed to the steering column 42 and having an arm that is connected to the piston 56 by way of a trunnion, instead of the above-described rack and pinion. In either the yoke and trunnion or rack and pinion example, the steering actuator 50 could be pneumatically or electrically actuated instead of hydraulically actuated.

Referring to FIG. 3, upper and lower bearings 66, 68 facilitate smooth rotational movement of the steering column 42 and lower unit 18 with respect to the steering housing 102. The upper and lower bearings 66, 68 surround the steering column 42 and are located radially between the steering column 42 and the inner perimeter of the through-bore in the steering housing 102. The upper bearings 66 are located above the steering actuator 50 and between an outer bearing surface on the steering column 42 and an inner bearing surface of the steering housing 102. The lower bearings 68 are located below the steering actuator 50 and between an outer bearing surface on the steering column 42 and an inner bearing surface of the steering housing 102. The type and configuration of the upper and lower bearings 66, 68 can vary from what is shown. In the illustrated example, the upper and lower bearings 66, 68 each comprise inner and outer races containing tapered roller bearings that extend at angles with respect to the steering axis 44.

FIGS. 4 and 5 depict steering motions of the lower unit 18 with respect to the steering housing 102. In FIG. 4, the noted operator input device controls the pump to supply pressurized hydraulic fluid to the port side fluid chamber 58, which forces the piston 56 to slide to the starboard side, as shown by arrows. Starboard movement of the piston 56 causes the rack and pinion 64 to rotate the steering column 42 and lower unit 18 clockwise when viewed from above with respect to the steering housing 102, as shown by the arrow. In FIG. 5, the noted operator input device controls the pump to supply pressurized hydraulic fluid to the starboard side fluid chamber 58, which forces the piston 56 to slide to the port side, as shown by the arrows. Port movement of the piston 56 causes the rack and pinion 64 to rotate the steering column 42 and lower unit 18 counterclockwise when viewed from above with respect to the steering housing 102, as shown by the arrow.

Thus, FIGS. 1-5 show a marine propulsion device 10 comprising a powerhead 24, a driveshaft 26 powered by the powerhead 24, and a lower unit 18. A propeller shaft 32 is supported in the lower unit 18 and is in torque transmitting relationship with the driveshaft 26 by way of extension members 38, 40 and clutch assembly 31. A rotatable portion (e.g., steering column 42) through which the driveshaft 26 extends and to which the lower unit 18 is coupled is configured to rotate the lower unit 18 with respect to the powerhead 24. A stationary portion (e.g., steering housing 102) through which the steering column 42 extends is stationary with respect to the powerhead 24. Although in the present example the rotatable portion is the steering column 42 and the stationary portion is the steering housing 102, these portions could have other names and/or functions, as will be discussed herein below with respect to FIG. 9.

Through research and development, the present inventors realized that it would be helpful to locate one or more sensors in the lower unit 18, such as to determine the level of lubricant in the lower unit 18 and/or whether water has leaked into the lower unit 18. The present inventors determined that a wireless sensor would likely create more problems than it would solve (e.g., access to the sensor to change its batteries), and therefore decided wired sensors would be more appropriate. However, the fact that the lower unit 18 and steering column 42 rotate with respect to the remainder of the marine propulsion device 10 presented a unique challenge, namely, how the sensors could be connected to power and to gauges or other types of displays to convey information to the user. Furthermore, the present inventors recognized that providing air or oil to the lower unit 18 could also present a problem due to its ability to rotate independently of the remainder of the marine propulsion device 10. To solve such problems, the present inventors developed a flexible conduit 70 (FIG. 3) coupled to and extending between the stationary portion (e.g., steering housing 102) and the rotatable portion (e.g., steering column 42), which flexible conduit 70 has slack between the stationary portion and the rotatable portion. Such slack is provided at portion 72 of the flexible conduit 70, as shown in FIG. 3. The flexible conduit 70 extends through both the steering column 42 and the steering housing 102, as will be described herein below in more detail. Although the flexible conduit 70 is shown as being cut off near an exhaust conduit 75 of the marine propulsion device 10, it should be understood that the flexible conduit 70 extends from the steering housing 102 as far as necessary to reach the components to which it is to be connected. The portion of the flexible conduit 70 that is located outside the steering housing 102 may be held by clips or other attachment devices to the outside of the steering housing 102 or to the exhaust conduit 75. An additional flexible conduit 74 can be located in the lower unit 18, and the two flexible conduits 70, 74 can both be coupled to a ring 76 that is coupled to the lower end 46 of the steering column 42.

Figure 6:
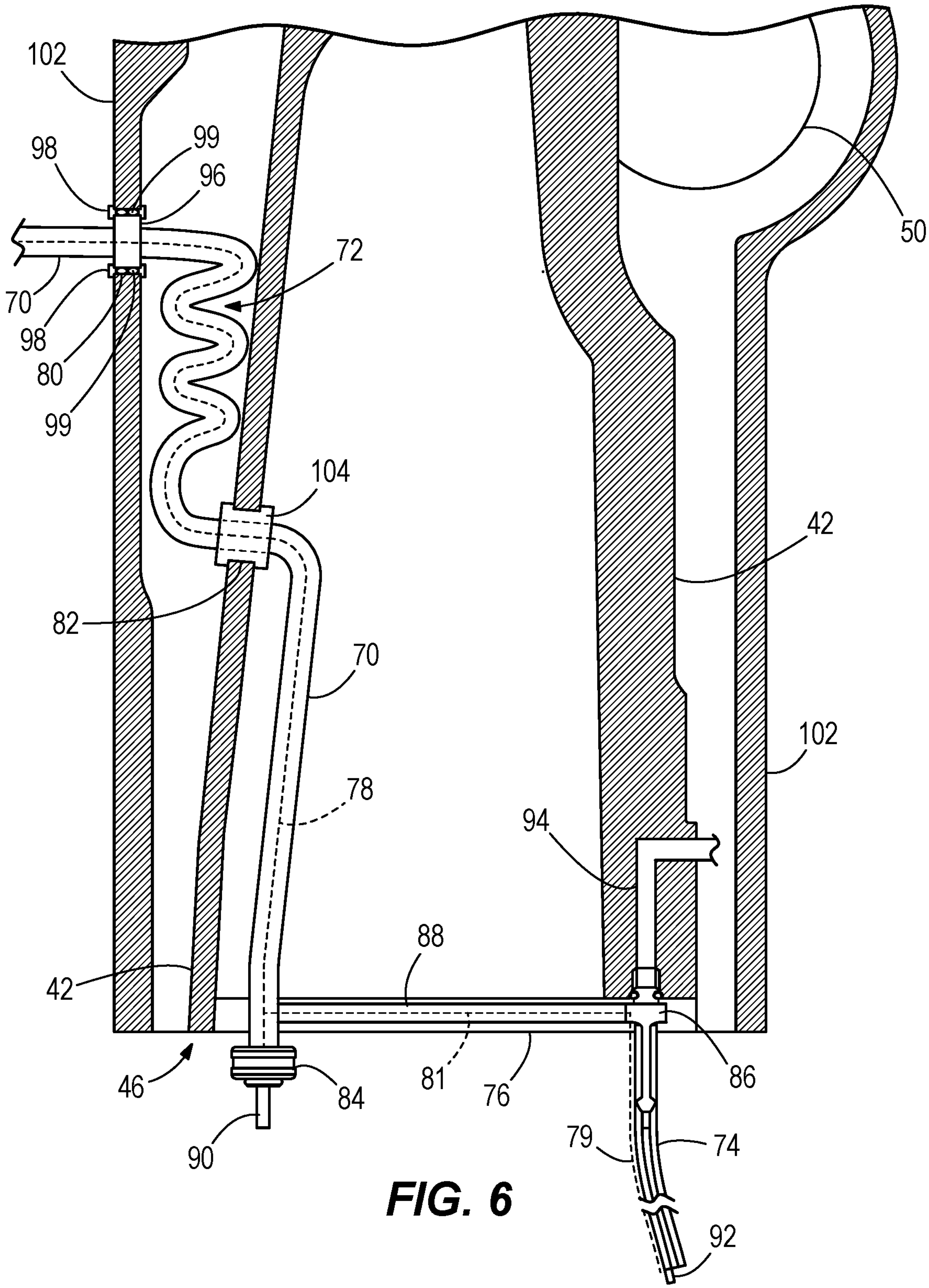
FIG. 6 is a schematic of an internal portion of the outboard motor.

FIG. 6 illustrates a close-up cross-sectional view of portions of the steering column 42 and steering housing 102 of the marine propulsion device 10. The elements shown and described in FIG. 6 are more schematic than in previous figures, and may not be to scale, in order to best illustrate the features of the present invention. In the example of FIG. 6, there is a wire 78 located in the flexible conduit 70, which is therefore referred to alternatively as a "wiring harness." (It should be understood that the wiring harness 70 could hold multiple wires 78, but that only one wire is shown here to reduce complexity.) However, it should be understood that similar concepts to those that will be described below apply to conduits that are configured to convey lubricant or air. The wiring harness 70 extends through an aperture 80 in the steering housing 102 and through an aperture 82 in the steering column 42, and the wiring harness 70 has slack between the steering housing 102 and the steering column 42. The ring 76 is coupled to the lower end 46 of the steering column 42, such as by way of bolting, over-molding, a threaded connection, a snap connection, or other known connection or attachment. The ring 76 comprises connectors 84, 86 configured to be coupled to the wiring harness 70. The connectors 84, 86 are electrical connectors that are electrically connected to the wires 78, 79, 81 in the wiring harness 70. The ring 76 may include a passageway 88 that is molded into the ring 76 or formed by a series of clips, which passageway 88 supports the wiring harness 70 where wire 81 extends between the connector 84 and the connector 86.

One or more sensors 90, 92 are provided in the lower unit 18 and/or the rotatable portion/steering column 42, and the wires 78, 79, 81 are electrically connected to the sensors 90, 92. For example, the sensor 90 can be a lubricant level sensor such as a capacitive or optical sensor for sensing a level of lubricant such as oil in the lower unit 18 and/or steering column 42. The sensor 90 can be plugged or snapped into the electrical connector 84 and thereby connected to the wire 78 so that it is easily installed. In another example, the electrical connector 84 is located on the upper surface of the ring 76, and the sensor 90 is oriented upwardly within the steering column 42. The sensor 92 can be a water-in-lubricant sensor such as a capacitive or resistive sensor. It may be molded into an end cap that fits on or in the lower end of the flexible conduit 74, which may be a vacuum hose for draining lubricant from within the lower unit 18. The sensor 92 can be connected by way of a wire 79 (shown in dashed lines) in a sheath that extends along the outside of the flexible conduit 74 and can be clipped or otherwise attached thereto. The connector 86 may therefore be a dual vacuum and electrical connector providing both a connection to the wires 78, 79, 81 in the wiring harness 70 and a sealed connection to a further vacuum tube 94 located above the ring 76, which may ultimately extend from the steering housing 102 for connection to a vacuum pump.

In order to contain the strain relief to the portion 72 of the wiring harness 70, the wiring harness 70 is sealed in place within the aperture 80 in the steering housing 102 and the aperture 82 in the steering column 42. For example, referring to FIGS. 6-8, a grommet 96 is provided in the aperture 80 in the steering housing 102 that forms a seal between the wiring harness 70 and the steering housing 102. The grommet 96 can be an elastomeric member with an aperture through which the wiring harness 70 or the individual wires 78 pass, and can be retained in place in the aperture 80 by way of a retaining ring 98 and a pair of O-rings 99. In another example, the grommet 96 is press-fit into the aperture 80; however, a more robust seal like that shown herein may be desirable in order to prevent water intrusion into the steering housing 102. The wiring harness 70 may pass through a simple O-ring-like grommet 104 held tightly within the aperture 82 in the steering column 42. A fluid-tight seal is not as critical at this location because the steering column 42 does not form part of the water-lubricant barrier.

Figure 7:
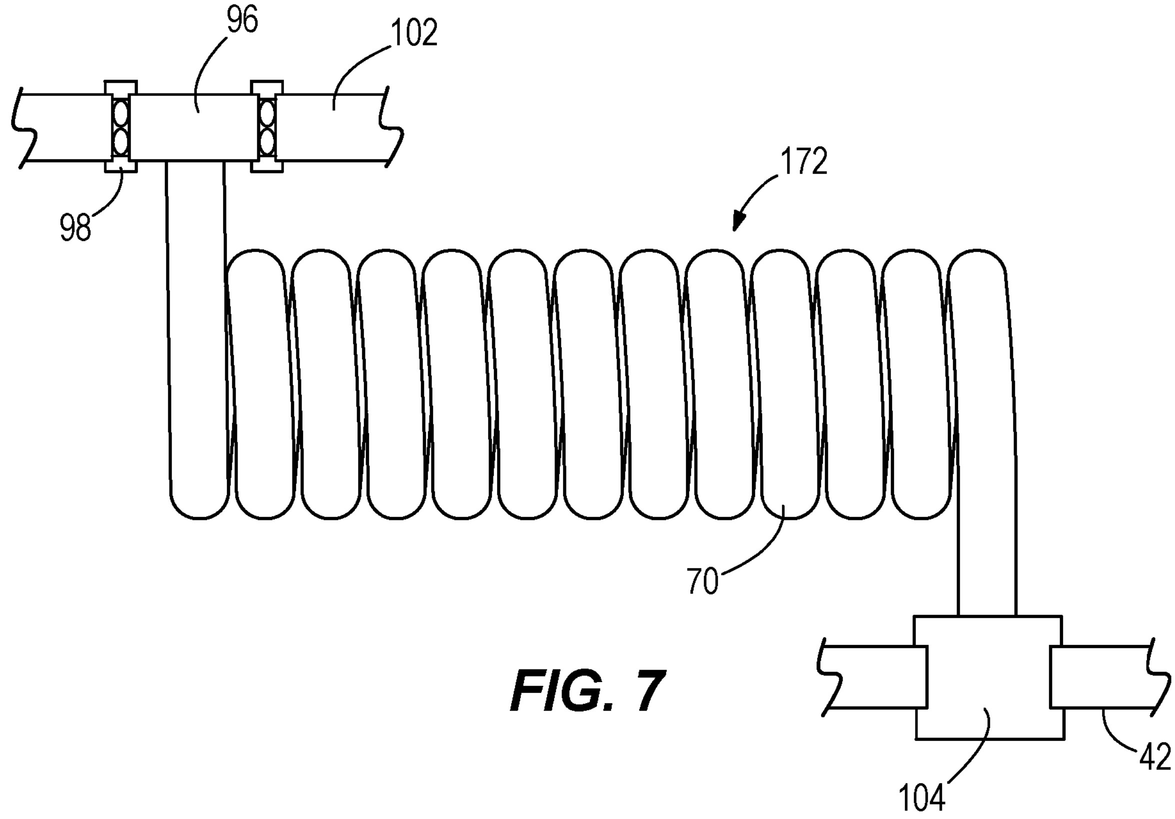
FIG. 7 shows one example of a section of a flexible conduit for use in the assemblies of the present disclosure.
Figure 8:
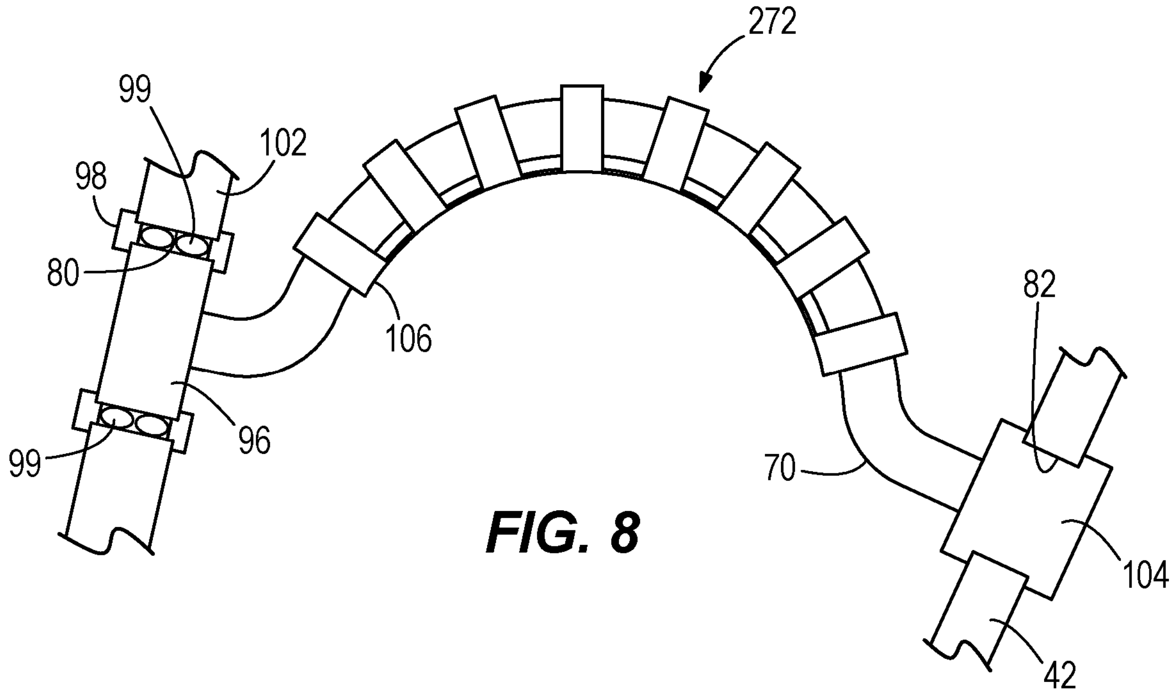
FIG. 8 shows another example of a section of a flexible conduit for use in the assemblies of the present disclosure.

FIGS. 7 and 8 show alternatives for the slack portion 72 of the wiring harness 70. As shown in FIG. 7, which shows a top view of the assembly, the wiring harness 70 can have a helically coiled portion 172, similar to a telephone cord, between the steering housing 102 and the steering column 42. When the aperture 82 in the steering column 42 is generally on the same side of the assembly as the aperture 80 in the steering housing 102, the helically coiled portion 172 is tightly coiled. As the steering column 42 rotates with respect to the steering housing 102, the aperture 82 moves further from the aperture 80, and the helically coiled portion 172 uncoils to allow the wiring harness 70 to extend between the two apertures 80, 82. The spring-like property of the helically coiled portion 172 recoils the wiring harness 70 as the steering column 42 rotates back to realign the aperture 82 with the aperture 80. As shown in FIG. 8, which shows a top view of the assembly, the wiring harness 70 has a looped portion 272 between the steering housing 102 and the steering column 42, and the looped portion 272 is covered by a flexible sleeve 106. The flexible sleeve 106 may be a series of over-molded ribs that allow the wiring harness 70 to bend or fold over (i.e., loop) on itself in one direction. The wiring harness 70 will fold over on itself the most when the aperture 82 in the steering column 42 is generally on the same side of the assembly as the aperture 80 in the steering housing 102. The wiring harness 70 gradually unfolds as the steering column 42 rotates with respect to the steering housing 102.

In the above-described example, the marine propulsion device 10 is an outboard motor as shown in FIGS. 1-6. However, those skilled in the art would understand that the same or similar assemblies could be used to provide a flexible conduit to a lower unit of a pod drive or stern drive.

Figure 9:
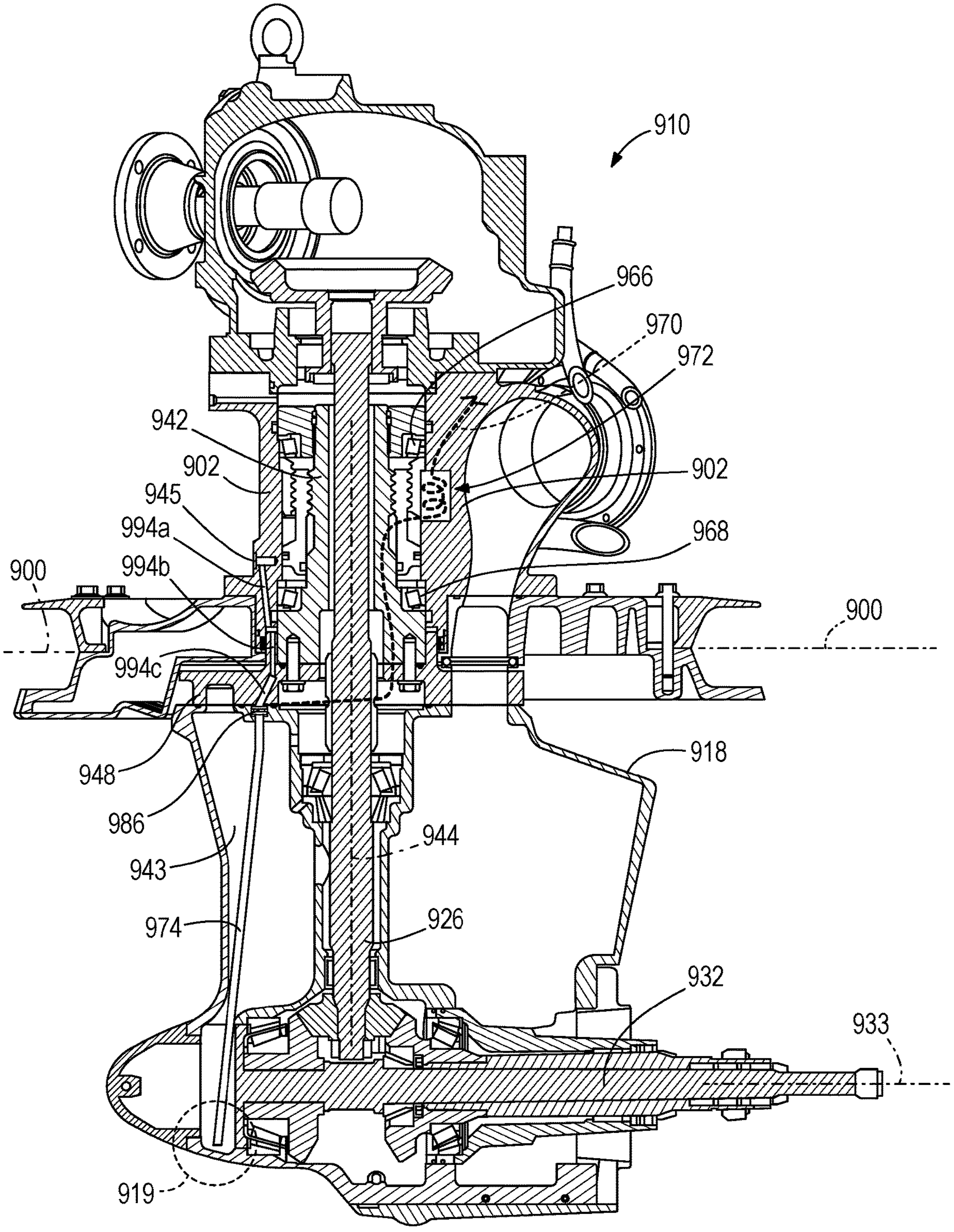
FIG. 9 illustrates a pod drive into which the assemblies of the present disclosure can be incorporated.

For example, FIG. 9 shows an example of a marine propulsion device 910 that is a pod drive. A lower unit 918 of the marine propulsion device 910 extends downwardly from a hull 900 of the marine vessel. The lower unit 918 is configured to support a propeller shaft 932 for rotation about a generally horizontal propeller axis 933. A stationary portion 902 of the marine propulsion device 910 is disposed above the hull line 900 of the marine vessel. The stationary portion 902 is configured to support the lower unit 918 for rotation about a generally vertical steering axis 944, which is coaxial with the driveshaft 926. The lower unit 918 rotates with a rotatable portion 942, to which the lower unit 918 is bolted. The rotatable portion 942 is set within a pair of upper and lower bearings 966, 968 that allow the rotatable portion 942 to rotate with respect to the stationary portion 902. An adapter plate 948 attached to the upper surface of the lower unit 918 rotates with the lower unit 918 about axis 944, which is also the steering axis of the marine propulsion device 910. A cavity 943 within the lower unit 918 is configured to contain oil therein. A discharge port 945 is formed in the stationary portion 902 in order to allow oil to be evacuated from the cavity 943. The discharge port 945 is in fluid communication with a bottom region 919 of the lower unit 918 by way of a flexible conduit 974 and conduits 994*a-c*. A connector 986 connects the flexible conduit 974 to the conduit 994*c*. A vacuum pump can be connected to discharge port 945 to drain oil from the cavity 943 of the lower unit 918, as is known.

Those having ordinary skill in the art will appreciate that a sensor, such as a water-in-lubricant sensor, can be installed at the lower end of the flexible conduit 974 that is used to drain oil from the lower unit 918, similar to the embodiment described herein above with respect to FIGS. 3 and 6. A wiring harness can be attached to or run along the outside of the flexible conduit 974 to provide electrical communication with the sensor. The connector 986 can include an electrical connector portion to allow the wiring harness to plug directly into electrical wiring within the adapter plate 948. Furthermore, a flexible conduit (shown schematically in dashed lines at 970) can be provided between the stationary portion 902 and the rotatable portion 942, similar to the flexible conduit 70 shown and described herein above. This flexible conduit 970 can provide electrical connection to power and gauges/displays on board the marine vessel. The flexible conduit 970 is provided with slack at portion 972 between the stationary portion 902 and the rotatable portion 942. The flexible conduit 970 can be connected to a sensor, such as a lubricant level sensor, installed on the adapter plate 948. Similar to the embodiment described with respect to FIG. 6, the adapter plate 948 can have an electrical connector configured to receive the sensor and connect it to wiring within the adapter plate 948. If desired, a separate ring can be provided at the lower end of the rotatable portion 942, which ring would hold the electrical connectors and wiring harness, as opposed to the wiring harness extending through passages in the adapter plate 948.

The present inventors determined that locating the slack portion 72, 972 of the flexible conduit 70, 970 within the interior of the marine propulsion device 10, 910, between the rotatable portion and the stationary portion, would be preferable over providing such slack outside of the marine propulsion device 10, 910, where it would be exposed to water. Because the lower units 18, 918 of the present disclosure oscillate 30-45 degrees clockwise and counterclockwise from a neutral steering position, the slack portion 72, 972 is most prone to failure. Failure outside the water-oil boundary would lead to water leaking into the lower unit 18, 918, resulting in premature gearcase failure, which is the very problem the lube level sensor and the water in lubricant sensor are intended to prevent. In contrast, in the present examples, all strain relief is provided in an oil environment.

Furthermore, the provision of a wiring harness within the lower unit 18, 918 allows for further applications, such as connection of alternative electronics to the wiring harness 70, 970. For example, the wiring harness 70, 970 could connected to an electric motor or generator, a sonar depth finder, a speed sensor such as a pitot tube, a water pressure sensor in the cooling water intake cavity, a temperature sensor in the exhaust conduit, or a sensor that determines the quality of the lubricant in the lower unit 18, 918 (e.g., debris, temperature, pressure). For example, the sensor can be a lubricant quality sensor (e.g., oil quality sensor) that determines whether there are metallic contaminants in the lubricant and/or the lubricant additive conditions and/or other lubricant condition metrics that a user may desire to monitor.

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims.

What is claimed is:

1. A marine propulsion device comprising:

a powerhead;

a driveshaft powered by the powerhead;

a lower unit;

a propeller shaft supported in the lower unit and in torque transmitting relationship with the driveshaft;

a steering column through which the driveshaft extends and to which the lower unit is coupled, the steering column configured to rotate the lower unit with respect to the powerhead;

a steering housing through which the steering column extends, the steering housing being stationary with respect to the powerhead; and a wiring harness extending through an aperture in the steering housing and through an aperture in the steering column, the wiring harness having slack between the steering housing and the steering column.

2. The marine propulsion device of claim 1, further comprising a sensor in the lower unit and/or the steering column, the wiring harness being electrically connected to the sensor.

3. The marine propulsion device of claim 2, wherein the sensor is a lubricant level sensor, a lubricant quality sensor, and/or a water-in-lubricant sensor.

4. The marine propulsion device of claim 1, further comprising a ring coupled to a lower end of the steering column, the ring comprising a connector configured to be coupled to the wiring harness.

5. The marine propulsion device of claim 4, wherein the ring further comprises a passageway configured to support the wiring harness.

6. The marine propulsion device of claim 1, wherein the wiring harness has a helically coiled portion between the steering housing and the steering column.

7. The marine propulsion device of claim 1, wherein the wiring harness has a looped portion between the steering housing and the steering column, the looped portion being covered by a flexible sleeve.

8. The marine propulsion device of claim 1, wherein the marine propulsion device is an outboard motor.

9. The marine propulsion device of claim 1, further comprising a grommet in the aperture in the steering housing that forms a seal between the wiring harness and the steering housing.

10. A marine propulsion device comprising:

a powerhead;

a driveshaft powered by the powerhead;

a lower unit;

a propeller shaft supported in the lower unit and in torque transmitting relationship with the driveshaft;

a rotatable portion through which the driveshaft extends and to which the lower unit is coupled, the rotatable portion configured to rotate the lower unit with respect to the powerhead;

a stationary portion through which the rotatable portion extends, the stationary portion being stationary with respect to the powerhead; and a flexible conduit coupled to and extending between the stationary portion and the rotatable portion, the flexible conduit having slack between the stationary portion and the rotatable portion.

11. The marine propulsion device of claim 10, further comprising:

a wire located in the flexible conduit; and a sensor in the lower unit and/or the rotatable portion, the wire being electrically connected to the sensor.

12. The marine propulsion device of claim 11, wherein the sensor is a lubricant level sensor, a lubricant quality sensor, and/or a water-in-lubricant sensor.

13. The marine propulsion device of claim 10, further comprising a ring coupled to a lower end of the rotatable portion, the ring comprising a connector configured to be coupled to the flexible conduit.

14. The marine propulsion device of claim 13, wherein the ring further comprises a passageway configured to support the flexible conduit.

15. The marine propulsion device of claim 10, wherein the flexible conduit has a helically coiled portion between the rotatable portion and the stationary portion.

16. The marine propulsion device of claim 10, wherein the flexible conduit has a looped portion between the rotatable portion and the stationary portion, the looped portion being covered by a flexible sleeve.

17. The marine propulsion device of claim 10, wherein the marine propulsion device is an outboard motor.

18. The marine propulsion device of claim 10, wherein the stationary portion comprises an aperture through which the flexible conduit extends, and further comprising a grommet in the aperture that forms a seal between the flexible conduit and the stationary portion.

19. The marine propulsion device of claim 10, wherein the rotatable portion is a steering column and the stationary portion is a steering housing.

20. The marine propulsion device of claim 10, wherein the flexible conduit extends through an aperture in the stationary portion and through an aperture in the rotatable portion.

* * * * *